United States Patent
Develle et al.

(10) Patent No.: US 10,962,387 B2
(45) Date of Patent: Mar. 30, 2021

(54) METHOD FOR MEASURING A DISPLACEMENT

(71) Applicant: SAFRAN ELECTRONICS & DEFENSE, Boulogne-Billancourt (FR)

(72) Inventors: Olivier Develle, Boulogne-Billancourt (FR); Jean-Luc Manca, Boulogne-Billancourt (FR)

(73) Assignee: Safran Electronics & Defense, Boulogne-Billancourt (FR)

(*) Notice: Subject to any disclaimer, the term of this patent is extended or adjusted under 35 U.S.C. 154(b) by 0 days.

(21) Appl. No.: 16/650,716

(22) PCT Filed: Sep. 28, 2018

(86) PCT No.: PCT/EP2018/076543
§ 371 (c)(1),
(2) Date: Mar. 25, 2020

(87) PCT Pub. No.: WO2019/068592
PCT Pub. Date: Apr. 11, 2019

(65) Prior Publication Data
US 2020/0284618 A1    Sep. 10, 2020

(30) Foreign Application Priority Data

Oct. 2, 2017   (FR) ...................... 17 59193

(51) Int. Cl.
*G01D 5/22*     (2006.01)
*G06F 17/00*    (2019.01)
(Continued)

(52) U.S. Cl.
CPC ......... *G01D 5/2291* (2013.01); *G01D 5/2073* (2013.01); *G01R 23/167* (2013.01);
(Continued)

(58) Field of Classification Search
None
See application file for complete search history.

(56) References Cited

U.S. PATENT DOCUMENTS

| 4,904,921 A |   | 2/1990 | DeVito et al. |
| 5,646,496 A | * | 7/1997 | Woodland .............. G05B 19/33 |
|             |   |        | 318/632 |

(Continued)

FOREIGN PATENT DOCUMENTS

| EP | 2833100 A2 | 2/2015 |
| FR | 2995992 A1 | 3/2014 |

*Primary Examiner* — John C Kuan
(74) *Attorney, Agent, or Firm* — Muncy, Geissler, Olds & Lowe, P.C.

(57) ABSTRACT

A method of measuring a movement, the method comprising the steps of: acquiring and digitizing both a first measurement voltage across the terminals of a first secondary winding and also a second measurement voltage across the terminals of a second secondary winding of an inductive movement sensor; multiplying the first measurement voltage by itself in order to obtain a first component of a crossed vector, multiplying the second measurement voltage by itself in order to obtain a second component of the crossed vector, and multiplying together the first measurement voltage and the second measurement voltage in order to obtain a third component of the crossed vector; applying the crossed vector as input to a lowpass filter in order to obtain a filtered vector, and estimating the movement from the components of the filtered vector.

7 Claims, 5 Drawing Sheets

(51) Int. Cl.
*G01R 23/167* (2006.01)
*G01D 5/20* (2006.01)
*G06F 17/16* (2006.01)

(52) U.S. Cl.
CPC .............. *G06F 17/00* (2013.01); *G06F 17/16* (2013.01); *G06F 2101/02* (2013.01); *G06F 2101/04* (2013.01); *G06F 2101/08* (2013.01)

(56) References Cited

U.S. PATENT DOCUMENTS

| | | | | |
|---|---|---|---|---|
| 6,642,710 | B2* | 11/2003 | Morrison | G01B 7/003 |
| | | | | 324/207.12 |
| 7,513,169 | B2* | 4/2009 | Noritou | G01D 5/2073 |
| | | | | 73/862.326 |
| 7,538,544 | B2* | 5/2009 | Lee | G01D 5/2053 |
| | | | | 324/207.17 |
| 8,324,888 | B2* | 12/2012 | Kim | G01D 5/2291 |
| | | | | 324/207.15 |
| 9,581,425 | B2* | 2/2017 | Buelau | G01B 7/003 |
| 2015/0362340 | A1 | 12/2015 | Montagne | |

* cited by examiner

METHOD FOR MEASURING A DISPLACEMENT

The invention relates to the field of methods of measuring a movement and that make use of an inductive movement sensor.

BACKGROUND OF THE INVENTION

Inductive movement sensors, such as linear variable differential transformers (LVDTs), rotary variable differential transformers (RVDTs), or resolvers are used in multiple applications in various industrial fields.

In particular, numerous inductive movement sensors are to be found in modern aircraft, where electromechanical actuators are progressively replacing both actuators that are purely mechanical and also actuators that are hydraulic.

Conventionally, such an inductive movement sensor includes a primary coil, a first secondary coil, and a second secondary coil. An excitation voltage is applied to the terminals of the primary coil. A first measurement voltage is generated across the terminals of the first secondary coil, and a second measurement voltage is generated across the terminals of the second secondary coil.

An electrical processor circuit then acquires the first measurement voltage and the second measurement voltage, and estimates the axial or angular movement on the basis of the first measurement voltage and of the second measurement voltage.

Synchronous demodulation is often used in the electrical processor circuit in order to estimate the movement. Synchronous demodulation consists in particular in multiplying the first measurement voltage by the in-phase excitation voltage and by the quadrature excitation voltage, and in multiplying the second measurement voltage by the in-phase excitation voltage and by the quadrature excitation voltage.

The electrical processor circuit must therefore acquire the excitation voltage in order to perform synchronous demodulation.

However, it frequently happens that the excitation voltage is not generated by the electrical processor circuit, but by an electrical generator circuit that is distinct from the electrical processor circuit and that is potentially situated at a certain distance away from the electrical processor circuit. By way of example, the electrical processor circuit may be integrated in equipment that is situated in the hold of the aircraft, while the electrical generator circuit may be integrated, for example, in remote equipment that is situated in the proximity of an actuator.

The electrical processor circuit and the electrical generator circuit therefore need to be connected together by a cable that conveys the excitation voltage to the electrical processor circuit.

OBJECT OF THE INVENTION

An object of the invention is to reduce the weight and to increase the reliability of a system that comprises an inductive movement sensor and an electrical processor circuit.

SUMMARY OF THE INVENTION

In order to achieve this object, there is provided a method of measuring a movement, the method comprising the steps of:
acquiring and digitizing both a first measurement voltage across the terminals of a first secondary winding and also a second measurement voltage across the terminals of a second secondary winding of an inductive movement sensor;
multiplying the first measurement voltage by itself in order to obtain a first component of a crossed vector, multiplying the second measurement voltage by itself in order to obtain a second component of the crossed vector, and multiplying together the first measurement voltage and the second measurement voltage in order to obtain a third component of the crossed vector;
applying the crossed vector as input to a lowpass filter in order to obtain a filtered vector; and
estimating the movement from the components of the filtered vector.

In order to estimate the movement, the measurement method of the invention thus does not make use of an excitation voltage applied to the terminals of a primary coil of the inductive movement sensor.

It is thus possible to omit the cable that is conventionally used for transmitting the excitation voltage, thereby reducing the weight of the system that comprises the inductive movement sensor and of the electrical processor circuit, while also increasing the reliability of said system.

There is also provided an electrical processor circuit for connection to an inductive movement sensor, the electrical processor circuit comprising a processor component arranged to perform the measurement method as described above.

There is also provided a system comprising both an electrical processor circuit as described above and also an inductive movement sensor.

Other characteristics and advantages of the invention appear on reading the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

The measurement method in a first implementation of the invention is for measuring the angular position of a rotor of an electric motor of an electromechanical actuator.

Figure 1:
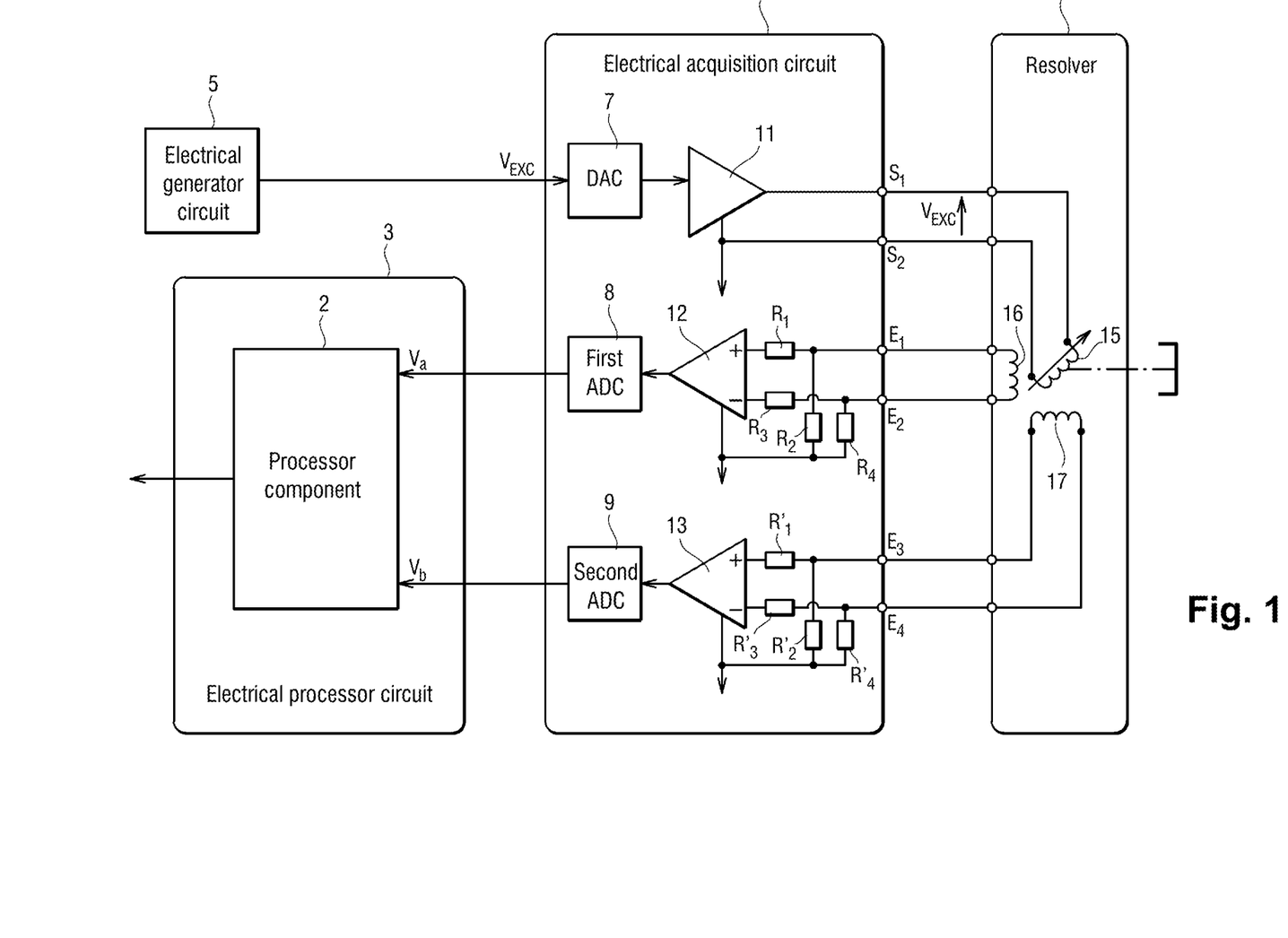
FIG. 1 shows a system comprising a resolver, an electrical acquisition circuit, an electrical processor circuit, and an electrical generator circuit, with a measurement method in a first implementation of the invention being performed in the electrical processor circuit.

With reference to FIG. 1, a resolver 1 is integrated in the electric motor. The resolver 1 comprises a stator and a rotor that is constrained to rotate with the rotor of the electric motor.

An angular movement of the rotor of the resolver 1 is measured in order to obtain an estimate of the angular position of the rotor of the electric motor.

The measurement method is performed in a processor component 2 of an electrical processor circuit 3. The electrical processor circuit 3 is mounted on an electric circuit card integrated in a first piece of electrical equipment. By way of example, the first piece of electrical equipment is a computer, a data concentrator, a control unit, etc.

In this example, the processor component 2 is a field programmable gate array (FPGA), however it could be some other component, e.g. a microcontroller, a processor, or an application specific integrated circuit (ASIC), etc.

The electrical processor circuit 3 is connected to an electrical acquisition circuit 4, which is itself connected to the resolver 1. An electrical generator circuit 5 is also connected to the electrical acquisition circuit 4. The electrical generator circuit 5 is mounted on an electric circuit card integrated in a second piece of electrical equipment that is situated at a certain distance from the first piece of electrical equipment.

The electrical acquisition circuit 4 includes a digital-to-analog converter 7, a first analog-to-digital converter 8, a second analog-to-digital converter 9, a first amplifier 11, a second amplifier 12, and a third amplifier 13.

An output of the electrical generator circuit 5 is connected to an input of the digital-to-analog converter 7. An output of the digital-to-analog converter 7 is connected to an input of the first amplifier 11. An output of the first amplifier 11 is connected to an output $S_1$ of the electrical acquisition circuit 4, and an electrical ground is connected to an output $S_2$ of the electrical acquisition circuit 4.

The second amplifier 12 is associated with four resistors $R_1$, $R_2$, $R_3$, and $R_4$. The resistor $R_1$ is connected between a non-inverting input of the second amplifier 12 and an input $E_1$ of the electrical acquisition circuit 4. A first terminal of the resistor $R_2$ is connected to a terminal of the resistor $R_1$, and a second terminal of the resistor $R_2$ is connected to electrical ground. The resistor $R_3$ is connected between an input of the second amplifier 12 and an input $E_2$ of the electrical acquisition circuit 4. A first terminal of the resistor $R_4$ is connected to a terminal of the resistor $R_3$, and a second terminal of the resistor $R_4$ is connected to electrical ground.

An output of the second amplifier 12 is connected to an input of the first analog-to-digital converter 8. An output of the first analog-to-digital converter 8 is connected to the processor component 2 of the electrical processor circuit 3.

Likewise, the third amplifier 13 is associated with four resistors $R'_1$, $R'_2$, $R'_3$, and $R'_4$. The four resistors $R'_1$, $R'_2$, $R'_3$, and $R'_4$ are connected between the third amplifier 13 and inputs $E_3$ and $E_4$, and they are arranged like the resistors $R_1$, $R_2$, $R_3$, and $R_4$.

An output of the third amplifier 13 is connected to an input of the second analog-to-digital converter 9. An output of the second analog-to-digital converter 9 is connected to the processor component 2 of the electrical processor circuit 3.

Each of the outputs $S_1$ and $S_2$ of the electrical acquisition circuit 4 is connected to a respective terminal of the primary winding 15 of the resolver 1. Terminals of a first secondary winding 16 of the resolver 1 are connected to the inputs $E_1$ and $E_2$. Terminals of a second secondary winding 17 of the resolver 1 are connected to the inputs $E_3$ and $E_4$.

When the angular position of the rotor of the electric motor is to be measured, the electrical generator circuit 5 produces a digital excitation voltage $V_{EXC}$, which is transformed into an analog excitation voltage $V_{EXC}$ by the digital-to-analog converter 7 of the electrical acquisition circuit 4. The excitation voltage $V_{EXC}$ is applied to the terminals of the primary winding 15 of the resolver 1.

The excitation voltage $V_{EXC}$ is such that:

$$V_{EXC} = U_0 \cdot \sin(\omega t + \varphi)$$

where $U_0$, $\omega$, and $\varphi$ are respectively the amplitude, the angular frequency, and the phase of the excitation voltage $V_{EXC}$.

A first measurement voltage $V_a$ across the terminals of the first secondary winding 16 of the resolver 1 is then acquired and digitized by the second amplifier 12 and by the first analog-to-digital converter 8. Likewise, a second measurement voltage $V_b$ across the terminals of the second secondary winding 17 of the resolver 1 is then acquired and digitized by the third amplifier 13 and by the second analog-to-digital converter 9.

Figure 2:
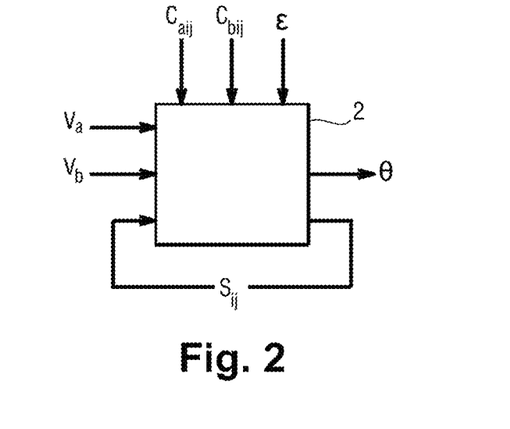
FIG. 2 shows a processor component of the electrical processor circuit.

With reference to FIG. 2, the first measurement voltage $V_a$ and the second measurement voltage $V_b$ are then acquired by the processor component 2 of the electrical processor circuit 3.

The first measurement voltage $V_a$ can be estimated theoretically by the formula:

$$V_a = V_{EXC} \cdot \sin(\theta)$$

where $\theta$ is the angular movement of the rotor of the resolver 1.

The second measurement voltage $V_b$ can be estimated theoretically by the formula:

$$V_b = V_{EXC} \cdot \cos(\theta).$$

The processor component 2 also acquires AR coefficients $C_{aij}$ and AM coefficients $C_{bij}$.

The AR coefficients $C_{aij}$ comprise AR coefficients $C_{a00}$, $C_{a01}$ of a first biquadratic filter, and AR coefficients $C_{a10}$, $C_{a11}$ of a second biquadratic filter.

The AM coefficients $C_{bij}$ comprise AM coefficients $C_{b00}$, $C_{b01}$, and $C_{b02}$ of a first biquadratic filter, and AM coefficients $C_{b10}$, $C_{b11}$, and $C_{b12}$ of a second biquadratic filter.

The processor component 2 also acquires a dead zone threshold $\varepsilon$.

Implementation of the measurement method makes use of a first state vector $S_{00}$ of the first biquadratic filter, a second state vector $S_{01}$ of the first biquadratic filter, a first state vector $S_{10}$ of the second biquadratic filter, and a second state vector $S_{11}$ of the second biquadratic filter.

In the present application, it should be observed that vectors are written using bold notation.

The vectors $S_{00}$, $S_{01}$, $S_{10}$, and $S_{11}$ are vectors, each comprising one column and four rows.

Figure 3:
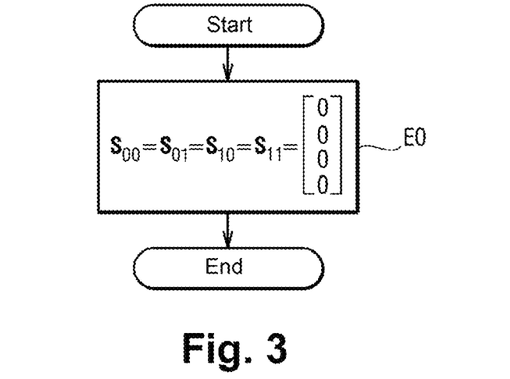
FIG. 3 shows an initialization step of the measurement method of the first implementation of the invention.

With reference to FIG. 3, the measurement method begins with an initialization step E0, during which the vectors $S_{00}$, $S_{01}$, $S_{10}$, and $S_{11}$ are initialized to zero:

$$S_{00} = S_{01} = S_{10} = S_{11} = \begin{bmatrix} 0 \\ 0 \\ 0 \\ 0 \end{bmatrix}.$$

Figure 4:
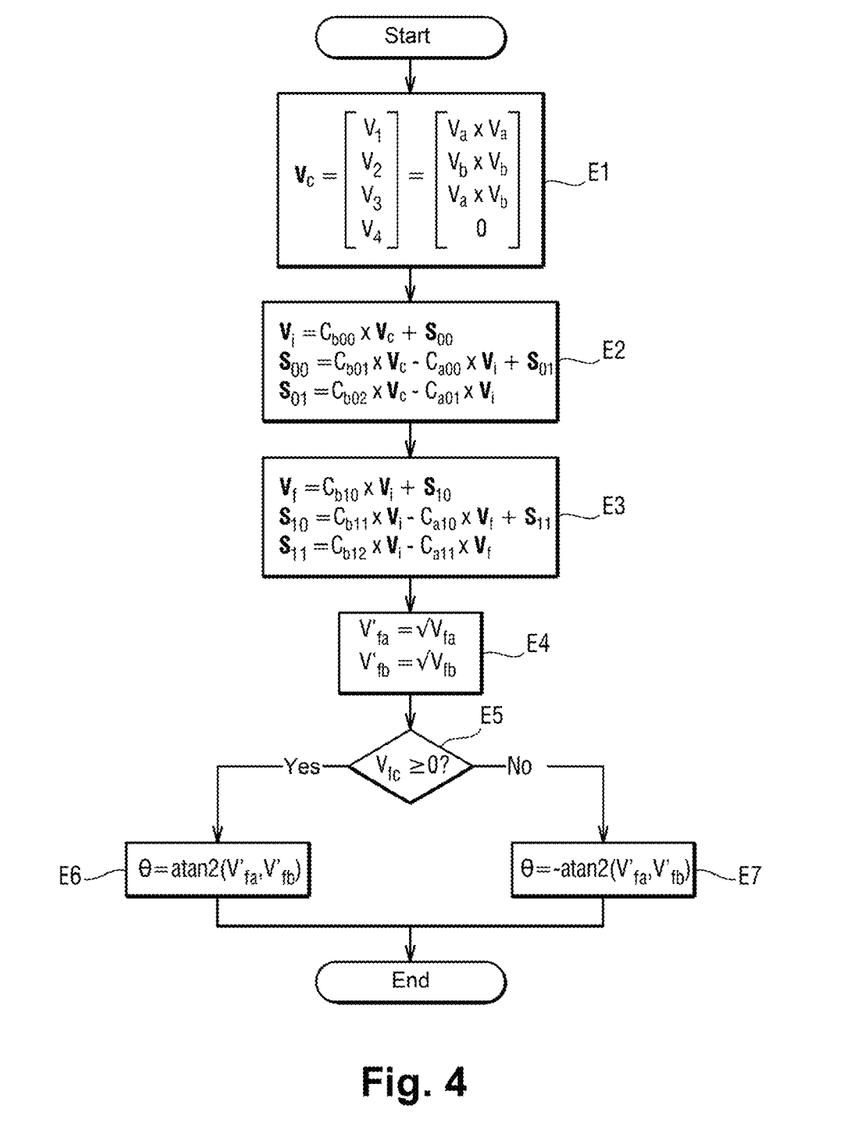
FIG. 4 shows steps of the measurement method of the first implementation of the invention.

With reference to FIG. 4, the first measurement voltage $V_a$ is then multiplied by itself in order to obtain a first component $V_1$ of a crossed vector $V_c$. The second measurement voltage $V_b$ is multiplied by itself to obtain a second component $V_2$ of the crossed vector $V_c$. The first measurement voltage $V_a$ and the second measurement voltage $V_b$ are multiplied together in order to obtain a third component $V_3$ of the crossed vector $V_c$. A fourth component $V_4$ of the crossed vector $V_c$ is set to zero (step E1).

Thus:

$$V_c = \begin{bmatrix} V_1 \\ V_2 \\ V_3 \\ V_4 \end{bmatrix} = \begin{bmatrix} V_A \cdot V_A \\ V_B \cdot V_B \\ V_A \cdot V_B \\ 0 \end{bmatrix}.$$

The crossed vector $V_c$ is then applied as input to a lowpass filter.

The lowpass filters serves to eliminate a $2\omega$ component from the crossed vector $V_c$.

The lowpass filter includes the first biquadratic filter and the second biquadratic filter.

The crossed vector $V_c$ is thus applied initially as input to the first biquadratic filter (step E2).

The following equations are obtained:

$V_i = C_{b00} \cdot V_c + S_{00}$ $S_{00} = C_{b01} \cdot V_c - C_{a00} \cdot V_i + S_{01}$ $S_{01} = C_{b02} \cdot V_c - C_{a01} \cdot V_i$ $V_i$ is an intermediate vector output by the first biquadratic filter.

The intermediate vector $V_i$ is then applied as input to the second biquadratic filter (step E3).

The following equations are then obtained:

$V_f = C_{b10} \cdot V_i + S_{10}$ $S_{10} = C_{b11} \cdot V_i - C_{a10} \cdot V_f + S_{11}$ $S_{11} = C_{b12} \cdot V_i - C_{a11} \cdot V_f$ $V_f$ is a filtered vector at the output from the second biquadratic filter.

The angular movement $\theta$ of the rotor of the resolver 1 is then estimated from the components of the filtered vector $V_f$.

The measurement method thus includes the step of calculating $V'_{fa} = \sqrt{V_{fa}}$, where $V_{fa}$ is a first component of the filtered vector $V_f$, and then of calculating $V'_{fb} = \sqrt{V_{fb}}$, where $V_{fb}$ is a second component of the filtered vector $V_f$ (step E4).

The sign of $V_f$ is then determined. $V_{fc}$ is a third component of the filtered vector $V_f$ (step E5).

If $V_{fc} \geq 0$, the angular movement $\theta$ is estimated by using the formula $\theta = \mathrm{atan}\,2(V'_{fa}, V'_{fb})$: step E6.

If $V_{fc} < 0$, the angular movement $\theta$ is estimated by using the formula $\theta = -\mathrm{atan}\,2(V'_{fa}, V'_{fb})$: step E7.

It should be observed that the function atan 2(y, x) can be defined as follows:

atan $2(y,x) = \arctan(y/x)$ if $x > 0$;

atan $2(y,x) = \pi/2 - \arctan(x/y)$ if $y > 0$;

atan $2(y,x) = \eta/2 - \arctan(x/y)$ if $y < 0$;

atan $2(y,x) = \arctan(y/x) \pm \pi$ if $x < 0$;

atan $2(y,x)$ being undefined if $x = 0$ and $y = 0$.

The measurement method then ends.

The measurement method can thus be performed without the electrical processor circuit 3 acquiring the excitation voltage $V_{EXC}$. Thus, there is no need to connect together the first piece of electrical equipment (in which the electrical processor circuit 3 is located) and the second piece electrical equipment (in which the electrical generator circuit 5 is located), by means of a cable dedicated to transmitting the excitation voltage $V_{EXC}$.

This serves to reduce the weight and the complexity of the system as described above, and to increase the reliability of said system.

It should be observed that the accuracy of the resulting measurement is the same as when performing synchronous demodulation that makes use of the excitation voltage $V_{EXC}$. Nevertheless, it is specified that the measurement taken without excitation is valid only for an angle $\theta$ lying in the range $[-\pi/2; \pi/2]$. Outside this definition range, there is ambiguity of $\pi$ radians on the measurement of the angle $\theta$.

There follows a description of a measurement method in a second implementation of the invention. This time, the measurement method in the second implementation of the invention is for measuring the angular position of an actuator member of an electromechanical actuator.

The measurement makes use of an RVDT. The angular movement of the rotor of the RVDT is measured in order to obtain an estimate of the angular position of the actuator member of the electromechanical actuator.

The hardware of the system that takes the measurement is similar to that of the system as described above.

Figure 5:
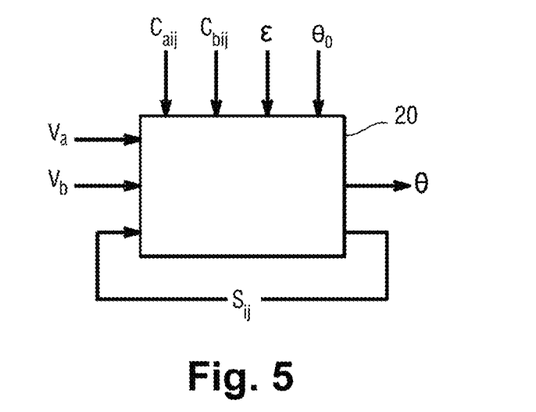
FIG. 5 shows a processor component of an electrical processor circuit in which use is made of a measurement method in a second implementation of the invention.

With reference to FIG. 5, the first measurement voltage $V_a$ and the second measurement voltage $V_b$ are then acquired by the processor component 20 of the electrical processor circuit.

The processor component 20 also acquires AR coefficients $C_{aij}$ and AM coefficients $C_{bij}$.

The AR coefficients $C_{aij}$ comprise AR coefficients $C_{a00}$, $C_{a01}$ of a first biquadratic filter, and AR coefficients $C_{a10}$, $C_{a11}$ of a second biquadratic filter.

The AM coefficients $C_{bij}$ comprise AM coefficients $C_{b00}$, $C_{b01}$, $C_{b02}$, and $C_{b03}$ of a first biquadratic filter, and AM coefficients $C_{b10}$, $C_{b11}$, $C_{b12}$, and $C_{b13}$ of a second biquadratic filter.

The processor component 20 also acquires a dead zone threshold $\varepsilon$.

The predator component 20 also acquires a maximum angular movement $\theta_0$.

Figure 6:
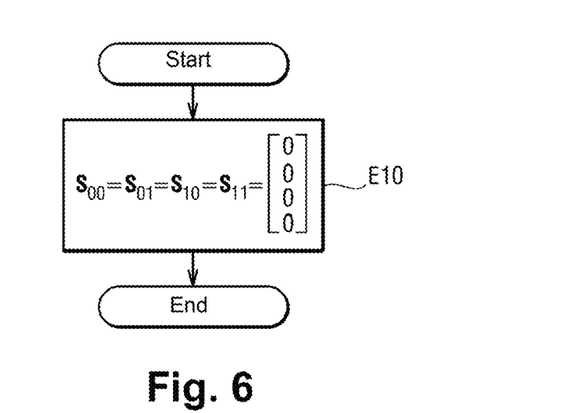
FIG. 6 shows an initialization step of the measurement method of the second implementation of the invention.

With reference to FIG. 6, the measurement method begins with an initialization step E10, during which the vectors $S_{00}$, $S_{01}$, $S_{10}$, and $S_{11}$ are initialized to zero:

$$S_{00} = S_{01} = S_{10} = S_{11} = \begin{bmatrix} 0 \\ 0 \\ 0 \\ 0 \end{bmatrix}.$$

Figure 7:
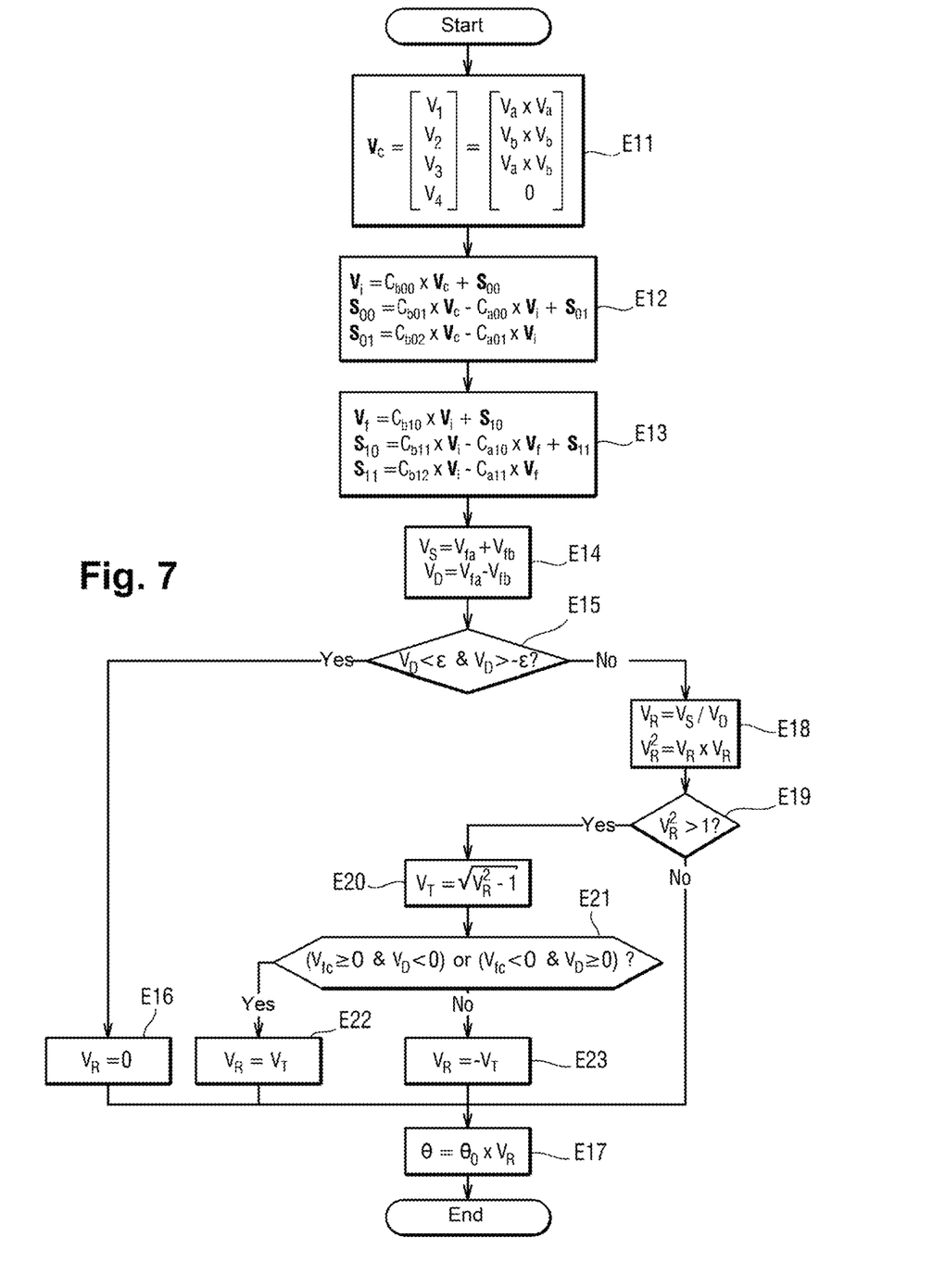
FIG. 7 shows steps of the measurement method of the second implementation of the invention.

With reference to FIG. 7, the first measurement voltage $V_a$ is then multiplied by itself in order to obtain a first component $V_1$ of a crossed vector $V_c$. The second measurement voltage $V_b$ is multiplied by itself to obtain a second component $V_2$ of the crossed vector $V_a$. The first measurement voltage $V_a$ and the second measurement voltage $V_b$ are multiplied together in order to obtain a third component $V_3$ of the crossed vector $V_c$. A fourth component $V_4$ of the crossed vector $V_c$ is set to zero (step E11).

Thus:

$$V_c = \begin{bmatrix} V_1 \\ V_2 \\ V_3 \\ V_4 \end{bmatrix} = \begin{bmatrix} V_A \cdot V_A \\ V_B \cdot V_B \\ V_A \cdot V_B \\ 0 \end{bmatrix}.$$

The crossed vector $V_c$ is then applied as input to a lowpass filter including the first biquadratic filter and the second biquadratic filter.

The crossed vector $V_c$ is initially applied as input to the first biquadratic filter (step E12).

The following equations are thus obtained:

$$V_i = Cb_{00} \cdot V_c + S_{00}$$

$$S_{00} = C_{b01} \cdot V_c - C_{a00} \cdot V_i + S_{01}$$

$$S_{01} = C_{b02} \cdot V_c - C_{a01} \cdot V_i$$

$V_i$ is an intermediate vector at the output from the first biquadratic filter.

The intermediate vector $V_i$ is then applied as input to the second biquadratic filter (step E13).

The following equations are then obtained:

$$V_f = C_{b10} \cdot V_i + S_{10}$$

$$S_{10} = C_{b11} \cdot V_i - C_{a10} \cdot V_f + S_{11}$$

$$S_{11} = C_{b12} \cdot V_i - C_{a11} \cdot V_f$$

$V_f$ is a filtered vector at the output from the second biquadratic filter.

The angular movement $\theta$ of the rotor of the RVDT is then estimated from the components of the filtered vector.

The measurement method thus includes the step of calculating $V_S = V_{fa} + V_{fb}$ and $V_D = V_{fa} - V_{fb}$, where $V_{fa}$ is a first component of the filtered vector $V_f$ and $V_{fb}$ is a second component of the filtered vector $V_f$ (step E14).

If $V_D < \varepsilon$ and $V_D > -\varepsilon$ (step E15), then the measurement method includes the step of setting:

$$V_R = 0 \quad \text{(step E16)}.$$

The angular movement $\theta$ is then estimated by using the formula:

$$\theta = \theta_0 \cdot V_R \quad \text{(step E17)}.$$

Otherwise, the measurement method includes the step of calculating:

$$V_R = V_S/V_D \text{ and } V_R^2 = V_R \cdot V_R \quad \text{(step E18)}.$$

Thereafter, $V_R^2$ is compared with 1 (step E19).

If $V_R^2 \leq 1$, the angular movement $\theta$ is estimated by using the formula:

$$\theta = \theta_0 \cdot V_R \quad \text{(step E17)}.$$

If $V_R^2 > 1$, the measurement method includes the step of calculating:

$$V_T = \sqrt{V_R^2 - 1} \quad \text{(step E20)}.$$

Under such circumstances, if: $V_{fc} \geq 0$ and $V_D < 0$, or if $V_{fc} < 0$ and $V_D \geq 0$ (step E21), then the measurement method includes a step of setting:

$$V_R = V_T \quad \text{(step E22)}.$$

$V_{fc}$ is a third component of the filtered vector $V_f$.

Otherwise, the measurement method includes a step of setting:

$$V_R = -V_T \quad \text{(step E23)}.$$

The angular movement $\theta$ is then estimated by using the formula:

$$\theta = \theta_0 \cdot V_R \quad \text{(step E17)}.$$

The measurement method then ends.

It should be observed at this point that the measurement method in the second implementation of the invention can also be used with an LVDT, serving to measure a linear movement X.

In the above, the angular movement $\theta$ should be replaced by the linear movement X, and the maximum angular movement $\theta_0$ should be replaced by the maximum linear movement $X_0$.

The measurement method is thus generalized by using a movement $\underline{d}$ and a maximum movement $d_0$. $\underline{d}$ is an angular movement or a linear movement, and $d_0$ is a maxim-m angular movement or a maximum linear movement.

Naturally, the invention is not limited to the embodiments described, but covers any variant coming within the ambit of the invention as defined by the claims.

It is stated above that the first piece of electrical equipment and the second piece of electrical equipment are not connected together by a cable for transmitting the excitation voltage $V_{EXC}$. Specifically, the excitation voltage $V_{EXC}$ is not required by the measurement method of the invention.

Nevertheless, it should be observed that it is entirely possible for the first piece of electrical equipment and the second piece of electrical equipment to be connected together by such a cable. By way of example, it is then possible, in normal operation, to make provision for taking measurements by performing conventional synchronous demodulation that makes use of the excitation voltage. The measurement method of the invention is then used when the excitation voltage is no longer available, e.g. because the cable has broken.

The invention claimed is:

1. A method of measuring a movement, the method comprising:
    acquiring and digitizing both a first measurement voltage ($V_a$) across terminals of a first secondary winding and also a second measurement voltage ($V_b$) across terminals of a second secondary winding of an inductive movement sensor;
    multiplying the first measurement voltage by itself to obtain a first component ($V_1$) of a crossed vector ($V_c$), multiplying the second measurement voltage by itself to obtain a second component ($V_2$) of the crossed vector ($V_c$), and multiplying together the first measurement voltage and the second measurement voltage to obtain a third component ($V_3$) of the crossed vector ($V_c$);
    applying the crossed vector as input to a lowpass filter to obtain a filtered vector ($V_f$); and
    estimating the movement from the components of the filtered vector ($V_f$).

2. The measurement method according to claim 1, wherein the lowpass filter includes a first biquadratic filter and a second biquadratic filter.

3. The measurement method according to claim 1, wherein the inductive movement sensor is a resolver and wherein the movement is an angular movement, the measurement method further comprising:

calculating $V'_{fa}=\sqrt{V_{fa}}$, where $V_{fa}$ is a first component of the filtered vector ($V_f$);

calculating $V'_{fb}=\sqrt{V_{fb}}$, where $V_{fb}$ is a second component of the filtered vector ($V_f$);

determining the sign of $V_{fc}$, where $V_{fc}$ is a third component of the filtered vector ($V_f$); and if $V_{fc} \geq 0$, estimating the angular movement $\theta$ by using the formula $\theta = \mathrm{atan}\, 2(V'f_a, V'f_b)$; or if $V_{fc} < 0$, estimating the angular movement $\theta$ by using the formula $\theta = -\mathrm{atan}\, 2(V'_{fa}, V'_{fb})$.

4. The measurement method according to claim 1, wherein the inductive movement sensor is a linear variable differential transformer (LVDT) or a rotary variable differential transformer (RVDT), the movement being a linear movement or an angular movement, the measurement method further comprising:

calculating $V_S = V_{fa} + V_{fb}$, where $V_{fa}$ is a first component of the filtered vector ($V_f$) and $V_{fb}$ is a second component of the filtered vector ($V_f$);

calculating $V_D = V_{fa} - V_{fb}$; and if $V_D < \varepsilon$ and $V_D > -\varepsilon$, setting $V_R = 0$, and estimating the movement d by using the formula $d = d_0 \cdot V_R$, where $d_0$ is a maximum movement and $\varepsilon$ is a dead zone threshold;

or else calculating $V_R = V_S/V_D$ and $V_R^2$ and estimating the movement d from $V_R^2$.

5. The measurement method according to claim 4, wherein said estimating the movement d from $V_R^2$ comprises:

comparing $V_R^2$ with 1;

if $V_R^2 \leq 1$, estimating the movement d by using the formula $d = d_0 \cdot V_R$; and if $V_R^2 > 1$, calculating $V_T = \sqrt{V_R^2 - 1}$; and if $V_{fc} \geq 0$ and $V_D < 0$, or if $V_{fc} < 0$ and $V_D \geq 0$, $V_{fc}$ being a third component of the filtered vector ($V_f$), setting $V_R = -V_T$, and estimating the movement d by using the formula $d = d_0 \cdot V_R$;

or else setting $V_R = -V_T$, and estimating the movement d by using the formula $d = d_0 \cdot V_R$.

6. An electrical processor circuit for connection to an inductive movement sensor, the electrical processor circuit comprising a processor component arranged to perform the measurement method according to claim 1.

7. A system comprising an electrical processor circuit according to claim 6 and an inductive movement sensor.

* * * * *